US007183683B2

United States Patent
Shafer et al.

(10) Patent No.: US 7,183,683 B2
(45) Date of Patent: Feb. 27, 2007

(54) INNER MAGNET OF A MAGNETIC COUPLING

(75) Inventors: Clark Shafer, Bolingbrook, IL (US); Radosay Trninich, Bridgeview, IL (US); William Blankemeier, Oak Park, IL (US)

(73) Assignee: PeopleFlo Manufacturing Inc., Franklin Park, IL (US)

( * ) Notice: Subject to any disclaimer, the term of this patent is extended or adjusted under 35 U.S.C. 154(b) by 0 days.

(21) Appl. No.: 11/165,095

(22) Filed: Jun. 23, 2005

(65) Prior Publication Data

US 2006/0290218 A1    Dec. 28, 2006

(51) Int. Cl.
*H02K 1/27*    (2006.01)
*H02K 21/26*    (2006.01)
*H02K 21/12*    (2006.01)

(52) U.S. Cl. ............. 310/156.28; 310/104; 310/156.12

(58) Field of Classification Search ................ 310/104, 310/156.01, 154.12, 154.13, 156.28, 154.03, 310/154.14, 154.15, 156.12, 156.16, 156.17, 310/156.29; 417/420; 464/29

See application file for complete search history.

(56) References Cited

U.S. PATENT DOCUMENTS

| 4,011,120 A | 3/1977 | Aggen |
| 4,080,112 A | 3/1978 | Zimmermann |
| 4,514,153 A | 4/1985 | Sudbeck et al. |
| 4,549,341 A | 10/1985 | Kasabian |
| 4,617,726 A | 10/1986 | Denk |
| 4,625,135 A | 11/1986 | Kasabian |
| 4,722,661 A | 2/1988 | Mizuno |
| 4,746,827 A * | 5/1988 | Ochiai et al. .......... 310/156.22 |
| 4,752,194 A | 6/1988 | Wienen et al. |
| 4,792,712 A | 12/1988 | Stokes |
| 4,795,932 A * | 1/1989 | Long ...................... 310/154.14 |
| 4,837,472 A * | 6/1989 | Kotera .................. 310/156.22 |
| 4,869,654 A | 9/1989 | Klaus |
| 4,953,284 A * | 9/1990 | Hammer et al. .............. 29/596 |
| 4,998,863 A | 3/1991 | Klaus |
| 5,017,102 A * | 5/1991 | Shimaguchi et al. ....... 417/420 |
| 5,040,286 A | 8/1991 | Stark |
| 5,066,200 A | 11/1991 | Ooka |
| 5,090,944 A * | 2/1992 | Kyo et al. ..................... 464/29 |
| 5,154,587 A | 10/1992 | Mori et al. |
| 5,160,246 A | 11/1992 | Horiuchi |
| 5,170,085 A * | 12/1992 | Shinto ................... 310/156.28 |
| 5,175,461 A | 12/1992 | Zigler et al. |
| 5,184,945 A | 2/1993 | Chi-Wei |
| 5,237,737 A | 8/1993 | Zigler et al. |
| 5,269,664 A | 12/1993 | Buse |
| 5,345,669 A * | 9/1994 | Zigler et al. .................. 29/598 |
| 5,353,491 A * | 10/1994 | Gentry et al. ................. 29/596 |
| 5,464,333 A | 11/1995 | Okada et al. |

(Continued)

FOREIGN PATENT DOCUMENTS

JP    01-125591    5/1989

(Continued)

*Primary Examiner*—Burton S. Mullins
*Assistant Examiner*—Erik Preston
(74) *Attorney, Agent, or Firm*—Hanley, Flight & Zimmerman, LLC (57) ABSTRACT

An inner magnet assembly for a rotary magnetic coupling, the inner magnet assembly having an inner ring body with magnet guides, magnets and an overlying sleeve.

13 Claims, 7 Drawing Sheets

U.S. PATENT DOCUMENTS

| | | | |
|---|---|---|---|
| 5,475,276 A * | 12/1995 | Shiga et al. | 310/154.19 |
| 5,584,114 A * | 12/1996 | McManus | 29/596 |
| 5,679,994 A * | 10/1997 | Shiga et al. | 310/154.12 |
| 5,831,364 A | 11/1998 | Buse | |
| 5,881,447 A | 3/1999 | Molnar | |
| 5,990,855 A * | 11/1999 | Kobayashi et al. | 345/88 |
| 5,992,007 A | 11/1999 | Morii et al. | |
| 5,993,176 A | 11/1999 | Kingsford et al. | |
| 6,041,571 A * | 3/2000 | Fields et al. | 53/331.5 |
| 6,060,799 A * | 5/2000 | McManus et al. | 310/43 |
| 6,084,330 A | 7/2000 | Fisher et al. | |
| 6,097,125 A | 8/2000 | Park et al. | |
| 6,270,324 B1 | 8/2001 | Sullivan et al. | |
| 6,293,773 B1 | 9/2001 | Doberstein et al. | |
| 6,324,745 B1 | 12/2001 | Poag et al. | |
| 6,443,710 B1 | 9/2002 | Tatsukami et al. | |
| 6,457,951 B2 | 10/2002 | Rennett et al. | |
| 6,607,370 B2 | 8/2003 | Fukamachi et al. | |
| 6,710,476 B2 | 3/2004 | Tanozaki et al. | |
| 6,712,585 B2 | 3/2004 | Iehl et al. | |
| 6,903,475 B2 * | 6/2005 | Ortt et al. | 310/154.07 |
| 2002/0054820 A1 * | 5/2002 | Fukamachi et al. | 417/420 |
| 2002/0079770 A1 * | 6/2002 | Lai et al. | 310/156.28 |
| 2003/0011262 A1 | 1/2003 | Joho | |
| 2003/0025412 A1 * | 2/2003 | Hayfield | 310/156.01 |
| 2003/0062790 A1 * | 4/2003 | Reiter et al. | 310/156.49 |
| 2004/0013546 A1 * | 1/2004 | Klein et al. | 417/420 |
| 2004/0061395 A1 * | 4/2004 | Abordi et al. | 310/104 |
| 2004/0131485 A1 | 7/2004 | Shi | |
| 2004/0223864 A1 | 11/2004 | Miller et al. | |
| 2005/0104467 A1 * | 5/2005 | Corengia | 310/156.28 |
| 2005/0236927 A1 * | 10/2005 | Maeda et al. | 310/263 |

FOREIGN PATENT DOCUMENTS

| | | |
|---|---|---|
| JP | 03-074599 | 3/1991 |
| JP | 2000161280 | 6/2000 |

* cited by examiner

INNER MAGNET OF A MAGNETIC COUPLING

BACKGROUND OF THE INVENTION

1. Field of the Invention

The present invention generally relates to rotary magnetic couplings, also known as magnetic drives or magnetic clutches, and more particularly to an inner magnet assembly having an inner ring body with magnet guides, magnets and an overlying sleeve.

2. Discussion of the Prior Art

In many rotating devices such as pumps, it is desirable to avoid potential seal leakage by not using seals in conjunction with rotating parts. Accordingly, it has become more common to employ a magnetic drive system to eliminate the need for seals along rotating surfaces. While such devices may still employ static seals, because of their lack of dynamic or rotational seals, they have become known as "sealless". Indeed, magnetic drive structures have been used in the design of various pumps, including positive displacement gear pumps. Magnetic couplings or drive systems also may be used for example, in devices such as mixers, valves, compressors, clutches, and the like.

In prior art magnetically driven devices, it is common to have an inner magnet assembly with preselected magnets affixed to an inner ring and sealed from exposure to foreign fluids or gases to protect the magnets. The magnets typically are flat or bar-shaped and are substantially planar or arcuate, and are chosen to correspond in strength and number to the magnets on a complementary outer magnet assembly of the magnetic coupling. It is common for the inner magnet assembly to be referred to as the driven magnet, such as when an outer magnet assembly is connected to a rotational power system, such as an electric motor, and is referred to as the drive magnet.

The inner ring of prior art devices also may have slots about its periphery to locate the bar shaped magnets. However, the slots tend to be of the same depth throughout their length, with side walls covering significant portions of the sides of the magnets. This reduces the effectiveness of the magnetic coupling. This, in turn, tends to require the use of stronger or larger, more expensive magnets for a given torque capacity. The selection of magnets dictates the torque capacity of the magnetic drive assembly, and it is important to match the torque capacity of a device to the requirements for the device in order to manufacture and operate the device with as little heat generation and as efficiently as possible.

Once chosen, the magnets of the prior art devices normally are affixed to the inner ring using conventional fasteners, such as rivets or the like, or by using adhesives, such as epoxy or the like. In addition to being affixed in a relatively permanent manner to the inner ring, the magnets often are isolated from their immediate environment by the application of a sealant, a shrink wrap or comparable material to avoid corrosion or other ill effects. In some instances, protection of the magnets is achieved by a sleeve that is welded at each end to the inner ring to permanently seal the magnets within the assembly. However, use of fasteners, difficult to handle substances, such as epoxy, or other substances used to mount the magnets are not desirable from a cost and ease of manufacturing standpoint. Similarly use of shrink wraps, epoxy or other sealants, or welding of metallic sleeves to seal the magnets from the immediate environment also are not desirable. Moreover, the relatively permanent nature of the affixation of the magnets to the inner ring or welding of a sleeve results in a given prior art inner magnet assembly having a torque capacity that essentially is fixed, with the assembly not being easily reconfigurable for use in alternative applications having different torque capacity requirements.

Accordingly, it is desirable to simplify the manufacturing of inner magnet assemblies by removing the use of adhesives and sealants. It would be advantageous to eliminate the messy and more complicated permanent affixation of the magnets to the inner ring. While one may choose, to some extent, to use sealants or welding to seal the magnets from the environment, it would be advantageous to be able to eliminate them as well. It also is desirable to reduce the covering of the side walls of the magnets by the locating slot side walls, so as to be able to use smaller, thinner, less powerful or generally less expensive magnets to achieve a comparable magnetic coupling. In addition, it would be highly advantageous to be able to make an inner magnet assembly which can be readily reconfigured in terms of the selection of the number and strength of the magnets used, so as to be able to adapt devices to users changing needs, as opposed to having to replace the entire magnetically coupled device or the entire inner magnet assembly.

The present invention addresses shortcomings in prior art inner magnet assemblies, while providing the above mentioned desirable features.

SUMMARY OF THE INVENTION

The purpose and advantages of the invention will be set forth in and apparent from the description and drawings that follow, as well as will be learned by practice of the invention.

The present invention is generally embodied in an inner magnet assembly that uses a sleeve to hold magnets against an inner ring body, where the inner ring body has guides to locate and space apart the magnets. The sleeve also seals and protects the magnets from the surrounding environment. The sleeve may be permanently affixed to the inner ring body, or may be removably mounted to permit rebuilding or reconfiguration of the magnets used in the inner magnet assembly.

In a first aspect of the invention, an inner magnet assembly has an inner ring body, at least one magnet disposed adjacent the inner ring body, a sleeve slidably and sealingly mounted to the inner ring body, wherein the at least one magnet is sealed between the inner ring body and the sleeve, and wherein the sleeve has an annular outer wall with an indentation corresponding to each magnet whereby when installed on the inner ring body, each sleeve indentation engages its corresponding respective magnet and holds the respective magnet against the inner ring body.

In a further aspect of the invention, the inner ring body may have magnet guides, each of which engages a portion of a side of a respective magnet.

In another aspect of the invention, the sleeve may be removably mounted to the inner ring body.

Thus, the present invention presents an alternative to the prior art inner magnet assemblies for magnetically coupled devices. The present invention also simplifies the assembly of the components by optionally removing the need for adhesives and sealants. This new assembly reduces the covering of the magnet side walls by deep locating slots, while providing an assembly that can be rebuilt or reconfigured.

It is to be understood that both the foregoing general description and the following detailed description are exemplary and provided for purposes of explanation only, and are not restrictive of the invention, as claimed. Further features and objects of the present invention will become more fully apparent in the following description of the preferred embodiments and from the appended claims.

BRIEF DESCRIPTION OF THE DRAWINGS

In describing the preferred embodiments, reference is made to the accompanying drawing figures wherein like parts have like reference numerals, and wherein.

It should be understood that the drawings are not to scale and provide examples involving inner magnet assemblies that happen to be employed with rotors that are formed as pump impellers, while as noted above, inner magnet assemblies consistent with the scope and spirit of the present invention may be used in many other devices that utilize a magnetic coupling. While considerable mechanical details of an inner magnet assembly of a magnetic coupling, including other plan and section views of the particular components, have been omitted, such details are considered well within the comprehension of those skilled in the art in light of the present disclosure. It also should be understood that the present invention is not limited to the preferred embodiments illustrated.

DETAILED DESCRIPTION OF THE PREFERRED EMBODIMENTS

Referring generally to FIGS. 1–8, it will be appreciated that the inner magnet assembly of a magnetic coupling of the present invention generally may be embodied within numerous configurations within a device incorporating a magnetic coupling.

Referring to a preferred embodiment in FIGS. 1–5, an inner magnet assembly 2 has an inner ring body 6, which in this configuration further has a magnet ring 10 which is mounted on a rotor 30, such as by press fitting. A series of magnets 50 are held against magnet ring 10 by an overlying sleeve 70, as will be described in further detail.

Magnet ring 10 preferably is constructed of a magnetic material, such as steel, and has a first end 12 having an annular inner surface 12a. Magnet ring 10 has a second end 14 having an annular inner surface 14a. The outer surface of magnet ring 10 is machined, molded or otherwise formed to have small, upstanding magnet guides 16, longitudinally between which are surfaces 18, best seen in FIGS. 3–5. Surfaces 18 are recessed relative to the outer annular surface of magnet guides 16, and intersect planar surfaces 20 which run between the spaced apart magnet guides 16. Planar surfaces 20 create magnet locating surfaces around the periphery of magnet ring 10, with raised magnet guides 16 at each end of planar surfaces 20 to precisely locate magnets 50 on magnet ring 10.

Figure 1:
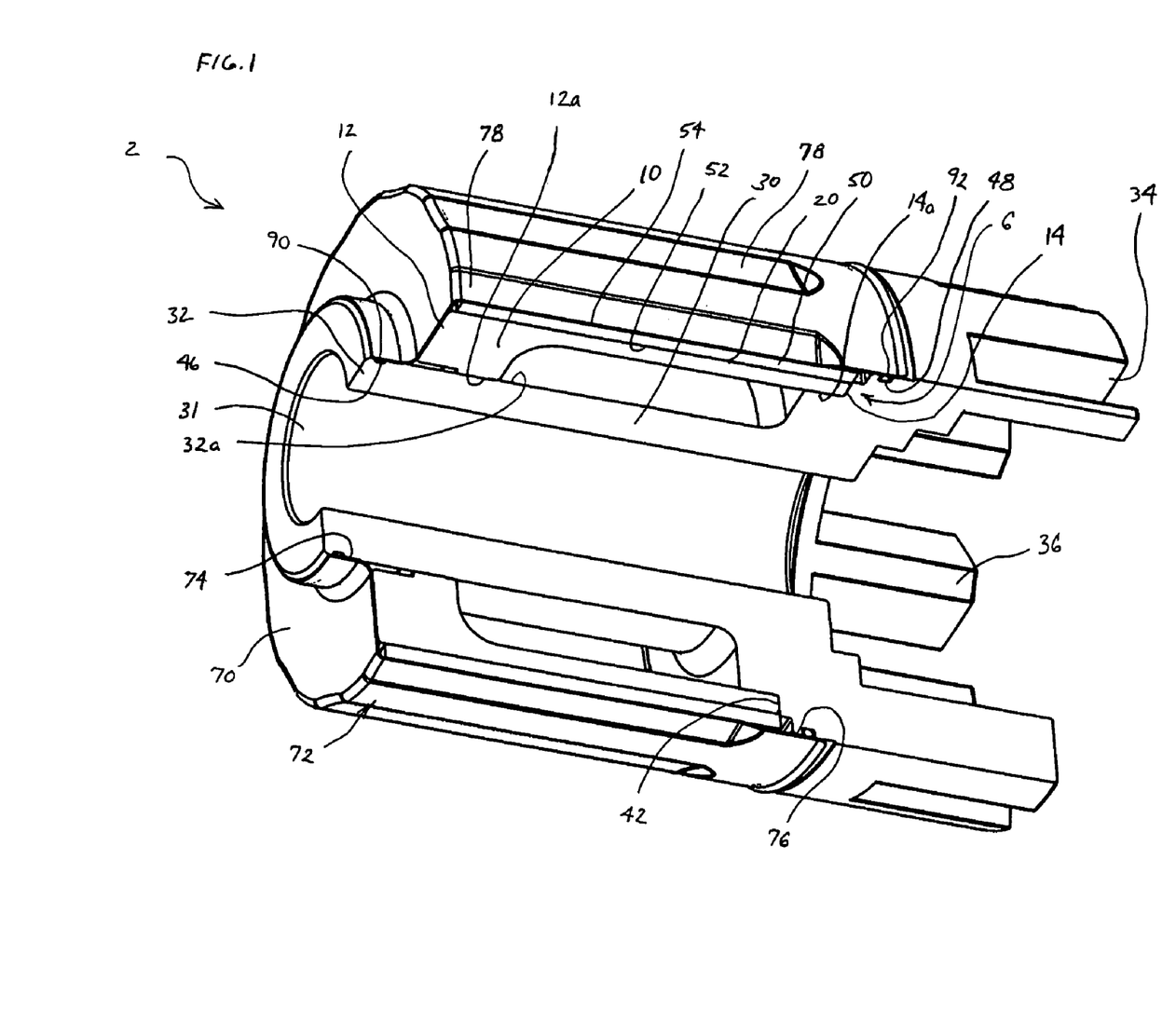
FIG. 1 is a perspective view, quarter-sectioned, of a first preferred embodiment of an inner magnet assembly consistent with the present invention and having an inner ring body having a magnet ring pressed onto a rotor.
Figure 2:
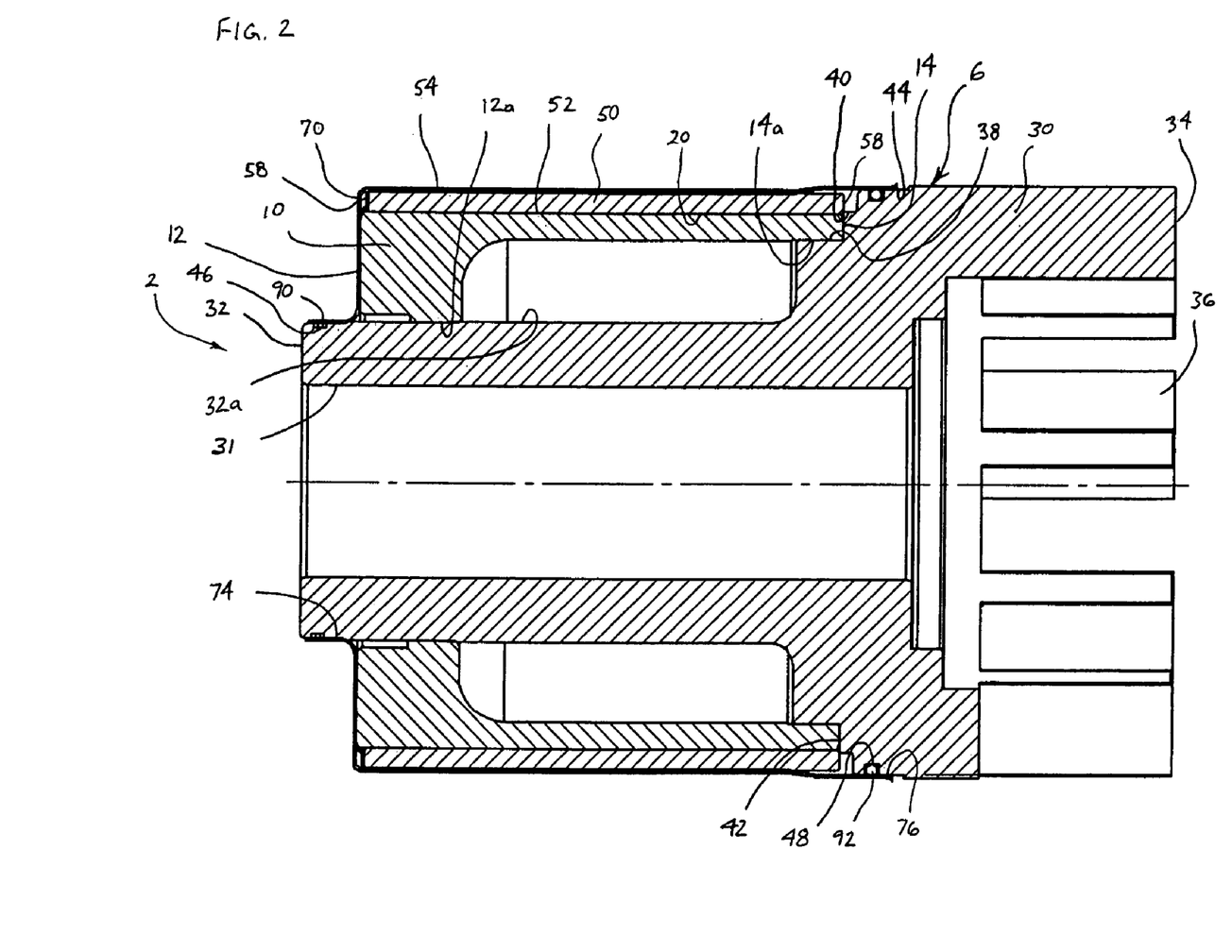
FIG. 2 is a cross-sectioned view of the inner magnet assembly of FIG. 1.

In the first preferred embodiment, magnet ring 10 is press fit over a portion of rotor 30, as best seen in FIGS. 1–2. Rotor 30 may be constructed of a solid rigid material, such as steel, stainless steel, alloys or plastics, and has an annular bore 31 longitudinally therethrough to receive a shaft. Rotor 30 has a first end 32. First end 32 has an annular outer surface 32a, which engages inner annular surface 12a of magnet ring 10 when assembled. Rotor 30 has a second end 34, which in this embodiment includes impeller blades 36. Between rotor first end 32 and second end 34, rotor 30 has further annular outer surfaces, including second annular outer surface 38, which engages inner annular surface 14a of magnet ring 10 when assembled. Rotor 30 has a third annular outer surface 40 corresponding to a diameter which is greater than that at annular outer surface 38, thereby creating shoulder 42 therebetween. Shoulder 42 serves as a stop when magnet ring 10 is press fit over rotor 30. Rotor 30 has still a further fourth annular outer surface 44 closer to rotor second end 34. Rotor 30 has a first groove 46 in first annular outer surface 32a for receipt of a first o-ring 90, and a second groove 48 in fourth annular outer surface 44 for receipt of a second o-ring 92.

Each magnet 50 may be of the typical rectangular, flat or bar-type, having a first planar side 52, a second planar side 54, side walls 56 and ends 58, or of any other suitable configuration. Each respective magnet 50 is installed between magnet guides 16, with the magnet first planar side 52 engaging a planar surface 20 of magnet ring 10, and being inserted until a magnet end 58 reaches the stop formed by shoulder 42. A series of magnets 50 are located in spaced relation to each other about the periphery of magnet ring 10. The relatively small magnet guides 16 at each end of magnets 50 serve to easily locate the magnets, yet do so with significantly less magnet side wall coverage and loss of magnet effectiveness than the full length deep slots typically found in prior art devices. It will be appreciated that alternatively, magnets of other shapes may be used. For instance, the assembly may employ arcuate magnets which would be fitted to corresponding arcuate surfaces on a magnet ring.

Sleeve 70 has a stepped outer annular wall 72, having a first annular inner surface 74 and a second annular inner surface 76. Sleeve 70 may be constructed of stainless steel, such as stainless 316, or may be constructed of other non-magnetic materials such as composites or plastics, and preferably is of a thin walled type to minimize the air gap that will be required between the magnets 50 of inner magnet assembly 2 and the magnets of a corresponding outer magnet assembly of a magnetic coupling.

As best seen in FIGS. 1–2, when sleeve 70 is slidingly installed over inner ring body 6, o-ring 90 provides a seal between rotor first annular outer surface 32a and sleeve annular inner surface 74. Similarly, o-ring 92 provides a seal between rotor fourth annular outer surface 44 and sleeve annular inner surface 76. These seals allow sleeve 70 to effectively encapsulate magnets 50 when installed on magnet ring 10.

Figure 3:
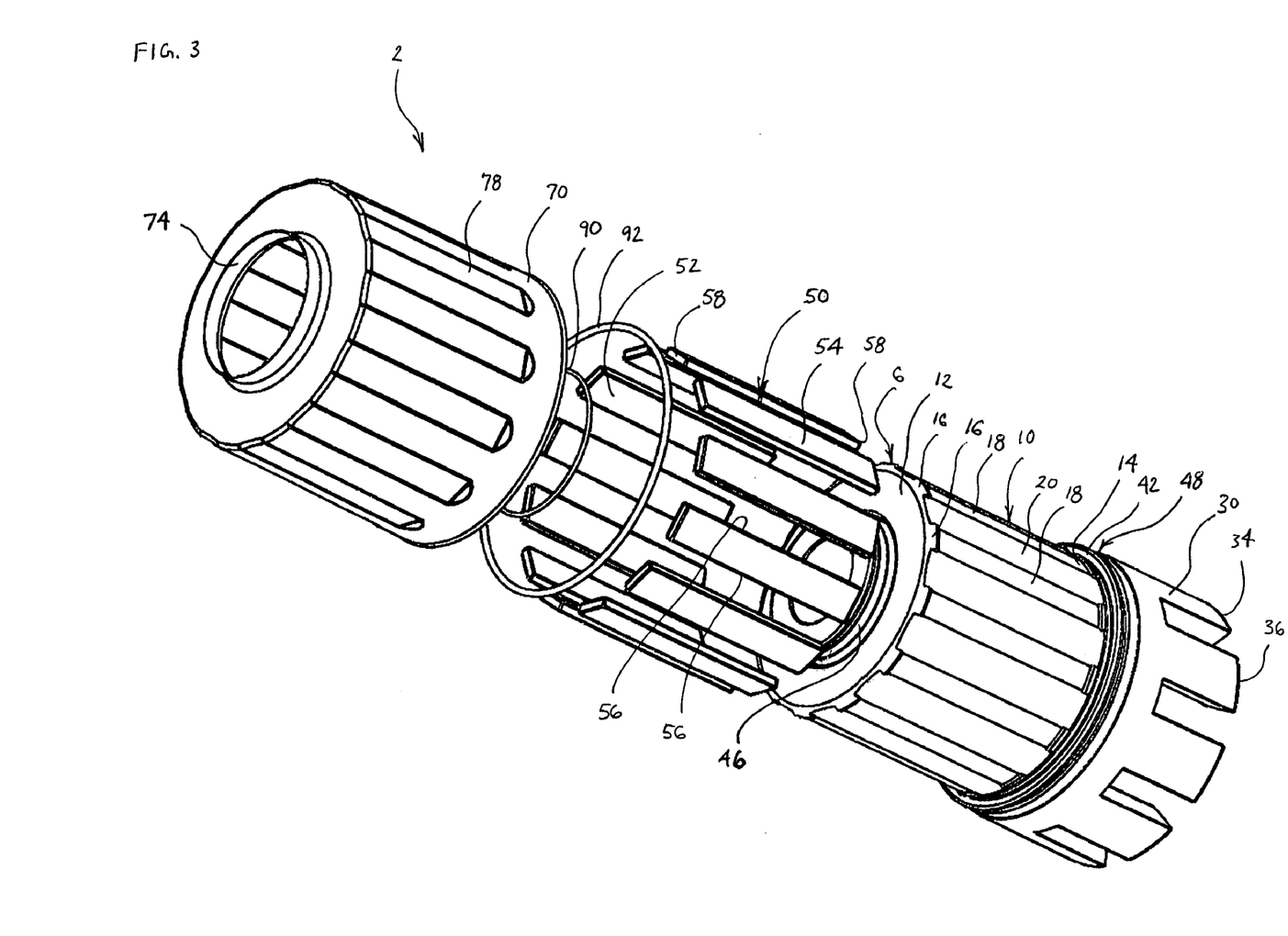
FIG. 3 is a perspective exploded view of the inner magnet assembly of FIG. 1.
Figure 4:
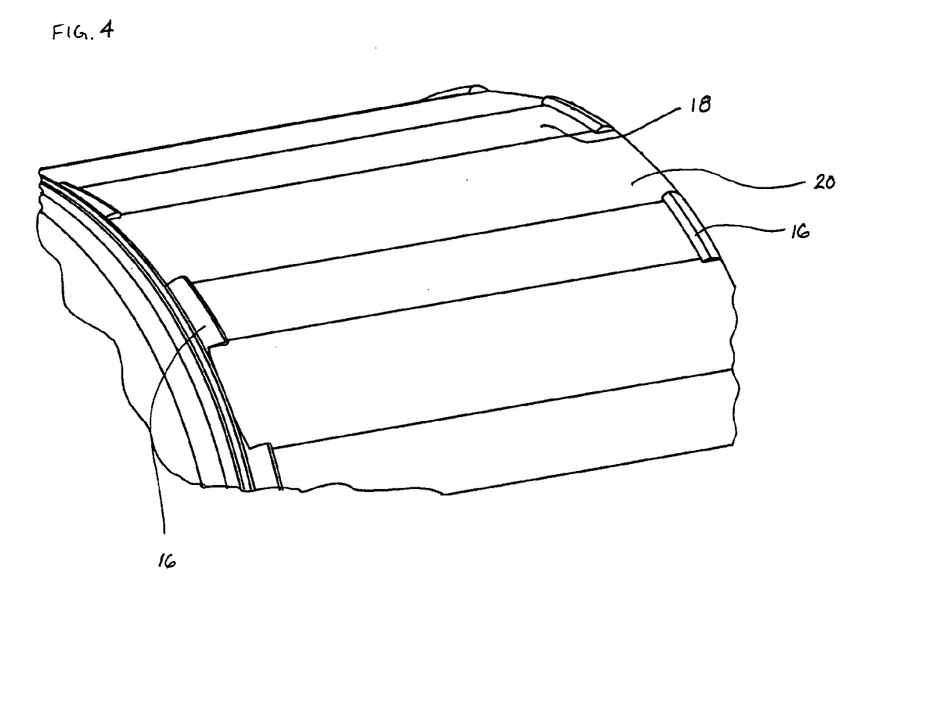
FIG. 4 is a perspective view of a portion of the magnet ring of FIG. 1.
Figure 5:
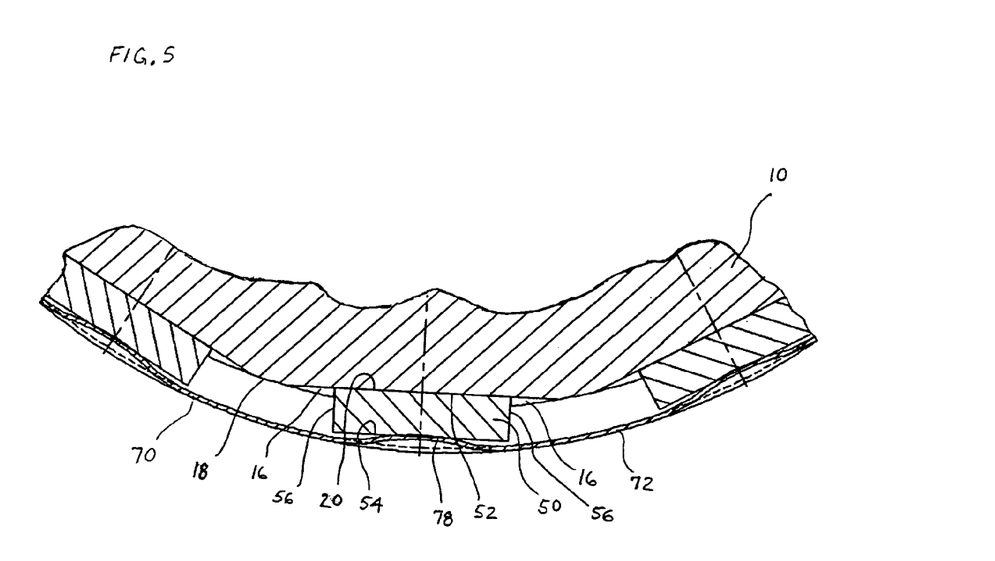
FIG. 5 is a radial cross-sectional view of a portion of the inner magnet assembly of FIG. 1.

Sleeve 70 also is configured to have embossments or indentations 78 which correspond to the location of magnets 50, best seen in FIGS. 1, 3 and 5. Each indentation 78 engages a respective second planar side 54 of a magnet, and tends to bias the magnet 50 toward engagement with magnet ring 10 to hold the respective magnets 50 in place. Indentations 78 may be elongated single impressions for each respective magnet 50, or may be a series of impressions or embossments to provide a sufficient biasing or spring affect against each magnet 50 along its length, or may be one or more annular indentations, each of which corresponds to and contacts one or more magnets.

It will be appreciated that sleeve 70 could be slidingly removed from inner ring body 6 to replace magnets 50 to repair inner magnet assembly 2 if it becomes damaged, or to add, subtract or substitute magnets of similar or different size or strength to reconfigure inner magnet assembly 2 for use in a device requiring a different torque characteristic of the magnetic coupling. It also will be understood that sleeve 70 could be sealed to inner ring body 6 using adhesives or other sealants in place of o-rings 90, 92, or could be sealed by means such as welding. However, these alternative methods of sealing present additional difficulties during assembly of an inner magnet assembly 2, increase the cycle time for assembly, and reduce the ability to quickly repair or reconfigure the assembly.

Figure 6:
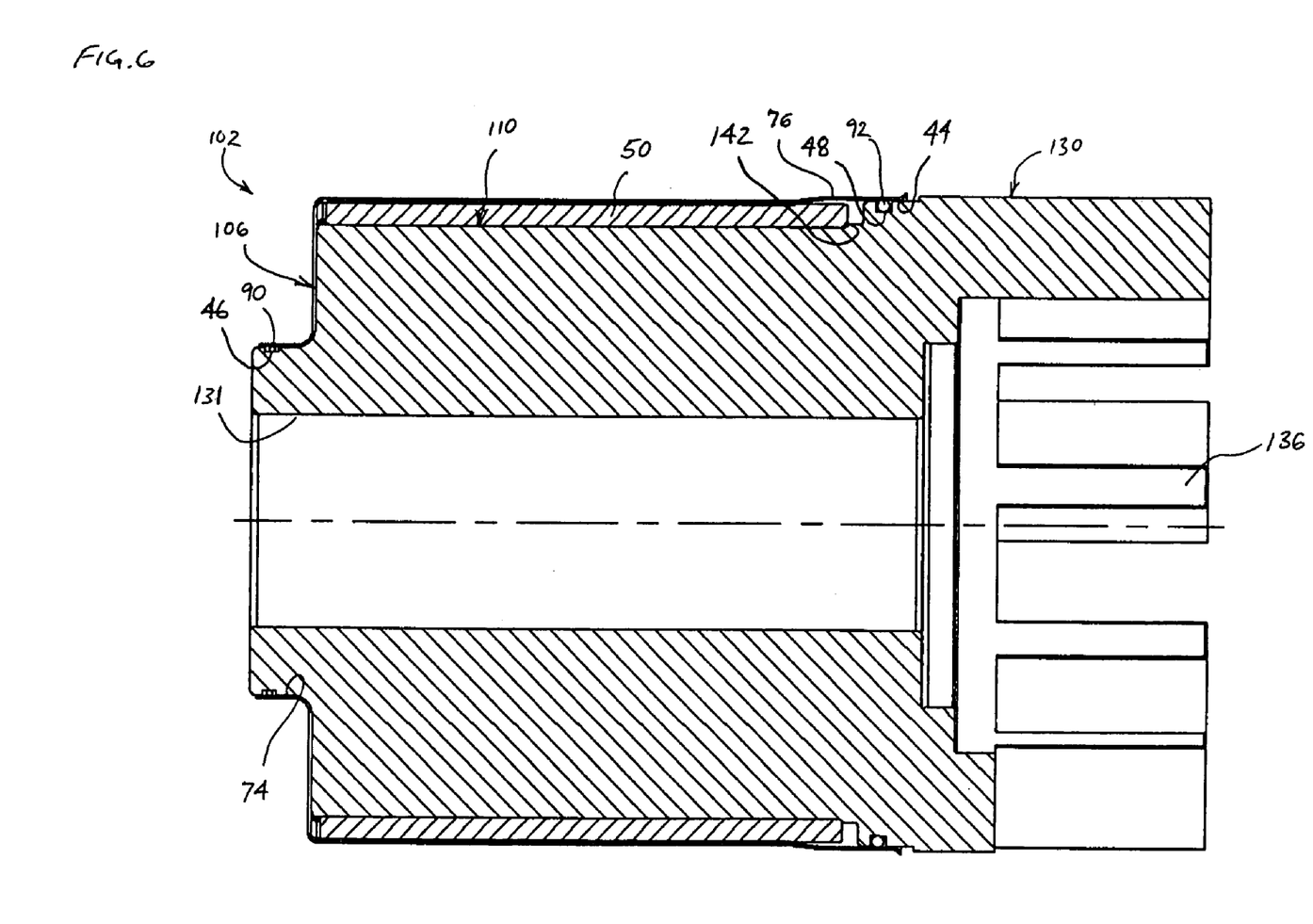
FIG. 6 is a cross-sectioned view of an alternative embodiment of an inner magnet assembly consistent with the present invention and having an inner ring body having an integral magnet ring and rotor.

As shown in the alternative embodiment in FIG. 6, an inner magnet assembly 102 may have an inner ring body 106 which may be constructed to have an integrally constructed magnet ring 110 and rotor 130. This alternative embodiment may use similar magnets 50 and sleeve 70 to that of the first preferred embodiment. It will be appreciated that in this alternative construction, although not shown in views repeating those of the first embodiment, the magnet-locating features of magnet ring 10 of the first preferred embodiment, such as magnet guides 16, and surfaces 18, 20, may be constructed in the same manner as with the first preferred embodiment, but directly on the outer surfaces of inner ring body 106. Given that a separate magnet ring is not press fit over a separate rotor in this embodiment, the shoulder 142 may be smaller as it need only act as a stop for magnets 50, and therefore, need not be as large as shoulder 42 of the first preferred embodiment. While the inner magnet assembly 102 may be used in a variety of magnetically coupled devices, it is shown with a bore 131 through inner ring body 106 for mounting on a shaft, and with integral rotor 130 having impeller blades 136 for ease of comparison to the first preferred embodiment.

Figure 7:
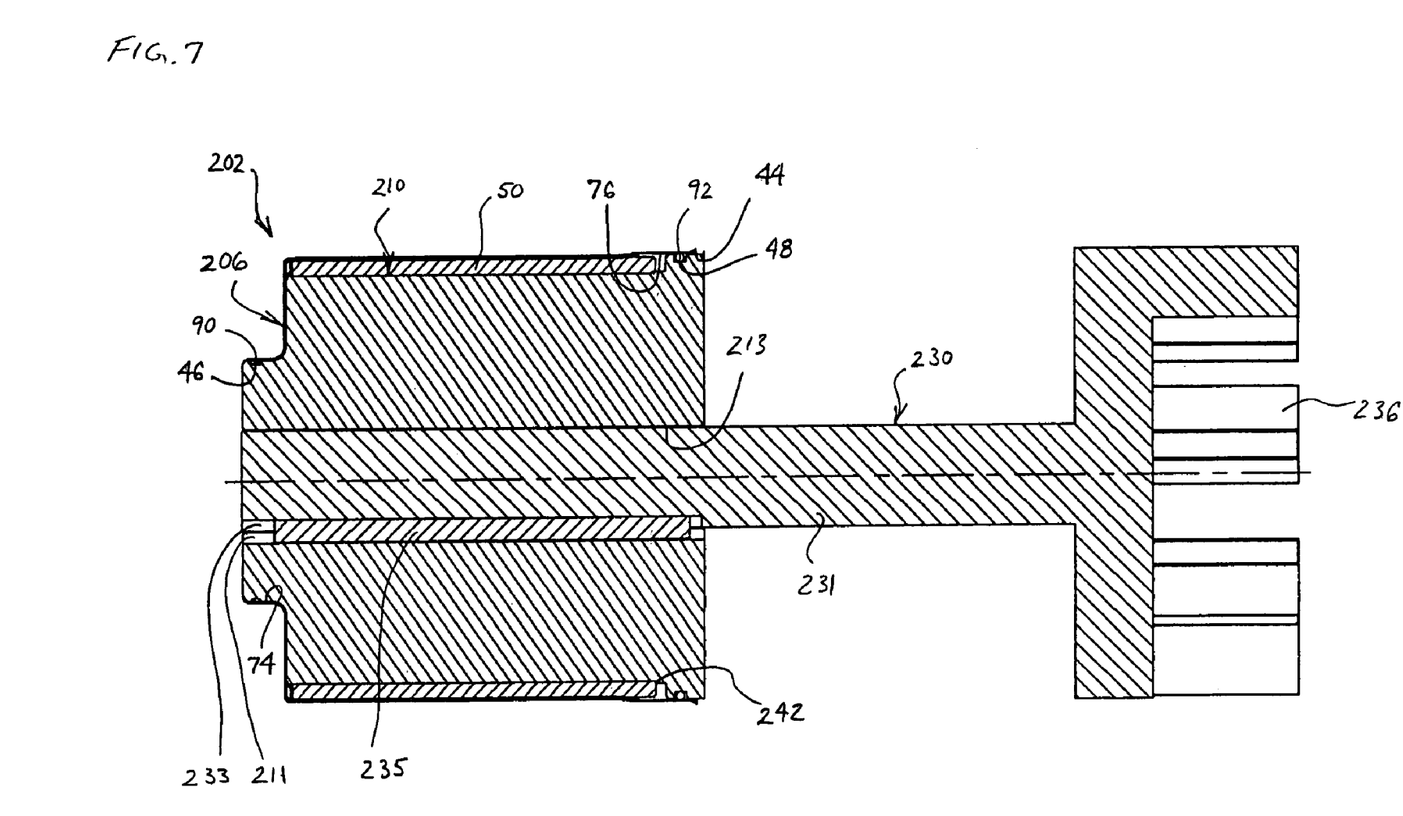
FIG. 7 is an alternative embodiment of an inner magnet assembly consistent with the present invention and having an inner ring keyed to a rotor shaft.

As shown by way of a further example of an alternative embodiment in FIG. 7, an inner magnet assembly 202 consistent with the present invention may be configured in still further ways. Inner magnet assembly 202 is shown having an inner ring body 206 which may be constructed to have a magnet ring 210 which is quite similar to the second embodiment in FIG. 6, except that inner ring body 206 does not have an integral rotor with impeller that would be mounted for rotation on a shaft. Instead, the third embodiment of FIG. 7 is shown with a magnet ring 210 having a keyway slot 211 in a bore 213 therethrough, and magnet ring 210 is mounted on a shaft 231 of a rotor 230 having a corresponding keyway slot 233. A removable key 235 is placed in keyway slots 211, 233 to join magnet ring 210 to rotor shaft 231. Rotor shaft 231 has impeller blades 236 at its opposite end. Thus, in this example of an inner magnet assembly for use in a magnetically coupled device, driving inner magnet assembly 202 with an outer magnet assembly (not shown) will, in turn, drive impeller blades 236.

Figure 8:
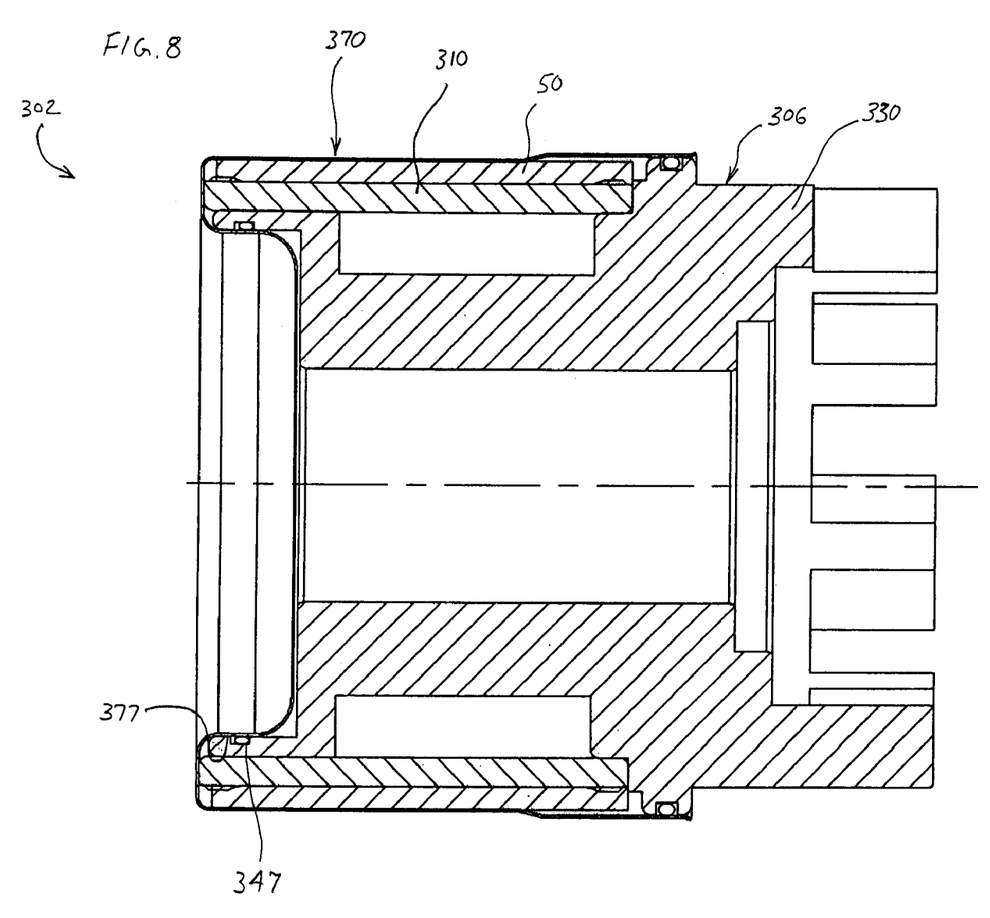
FIG. 8 is a further alternative embodiment of an inner magnet assembly consistent with the present invention and having a sleeve that is sealed along an inner annular surface of a rotor.

A further alternative embodiment is disclosed in FIG. 8, in the form of an inner magnet assembly 302 having an inner ring body 306 which has a magnet ring 310 mounted on a rotor 330. This alternative embodiment may use similar magnets 50 and employs a sleeve 370 having a modified configuration relative to the other preferred embodiments. It will be appreciated that in this alternative construction, although not shown in views repeating those of the first embodiment, magnet-locating features of the magnet ring and magnet holding features of the overlying sleeve 370 may be constructed in a similar manner as with the first preferred embodiment. The main difference illustrated in the embodiment of FIG. 8 is that sleeve 370 may be sealed along alternative surfaces, such as annular outward facing surface 377 at groove 347. This further demonstrates the flexibility that may be employed in the design of magnetically coupled devices while still utilizing the present invention.

It will be appreciated that the outer surfaces and magnet locating features of the integral magnet ring 110 and rotor 130 of inner ring body 106 of the second embodiment may be constructed on magnet ring 210 of inner ring body 206. As with the second embodiment, this alternative embodiment may use similar magnet locating features, magnets 50 and sleeve 70 to that of the first preferred embodiment. Thus, it will be appreciated that in this alternative construction, the magnet-locating features of magnet ring 10 of the first preferred embodiment, such as magnet guides 16, and surfaces 18, 20, may be constructed in the same manner as with the first preferred embodiment, but directly on the outer surfaces of magnet ring 210. Given that magnet ring 210 is not press fit over a rotor in this embodiment, the shoulder 242 may be smaller as it need only act as a stop for magnets 50, and therefore, need not be as large as shoulder 42 of the first preferred embodiment. While the inner magnet assembly 102 may be used in a variety of magnetically coupled devices, it is shown with a bore 231 therethrough for mounting on a shaft, and with the rotor having impeller blades 236 for further ease of comparison to the first and second preferred embodiments.

It will be appreciated that an inner magnet assembly in accordance with the present invention may be provided in various configurations. Any variety of suitable materials of construction, configurations, shapes and sizes for the components and methods of connecting the components may be utilized to meet the particular needs and requirements of an end user. It will be apparent to those skilled in the art that various modifications can be made in the design and construction of such an inner magnet assembly without departing from the scope or spirit of the present invention, and that the claims are not limited to the preferred embodiments illustrated.

What is claimed is:

1. An inner magnet assembly comprising:
   an inner ring body;
   at least one magnet disposed radially outward of and adjacent to the inner ring body and each magnet having a radially outward facing surface;
   a sleeve slidably and sealingly mounted to the inner ring body, wherein the at least one magnet is sealed between the inner ring body and the sleeve; and
   wherein the sleeve has an annular outer wall with at least one indentation corresponding to each magnet whereby when installed on the inner ring body, the radially outward facing surface of each magnet engages at least one sleeve indentation and the respective indentation biases the respective magnet radially inward against the inner ring body.

2. An inner magnet assembly in accordance with claim 1, wherein the inner ring body comprises a magnet ring mounted to a rotor.

3. An inner magnet assembly in accordance with claim 1, wherein the inner ring body comprises an integral magnet ring and rotor.

4. An inner magnet assembly in accordance with claim 1, wherein with respect to each magnet the inner ring body further comprises guides each of which engages a portion of a side of the respective magnet.

5. An inner magnet assembly in accordance with claim 1, wherein with respect to each magnet the inner ring body further comprises a planar surface which engages the respective magnet.

6. An inner magnet assembly in accordance with claim 1, wherein the sleeve is removably mounted to the inner ring body.

7. An inner magnet assembly in accordance with claim 6, further comprising at least two o-rings disposed between the inner ring body and the sleeve.

8. An inner magnet assembly in accordance with claim 1, wherein the sleeve is bonded to the inner ring body.

9. An inner magnet assembly in accordance with claim 4, wherein the guides are integrally formed in the outer surface of the inner ring body.

10. An inner magnet assembly in accordance with claim 4, wherein the inner ring body has recessed portions located longitudinally between the guides and being integrally formed on the outer surface of the inner ring body.

11. An inner magnet assembly in accordance with claim 4, wherein each magnet has a length and the guides do not extend along a substantial portion of the length of a respective magnet.

12. An inner magnet assembly in accordance with claim 2, wherein the rotor of the inner ring body further comprises an impeller.

13. An inner magnet assembly in accordance with claim 3, wherein the rotor of the inner ring body further comprises an impeller.

* * * * *